United States Patent
Wang et al.

(10) Patent No.: US 11,100,357 B2
(45) Date of Patent: *Aug. 24, 2021

(54) REAL-TIME MICRO AIR-QUALITY INDEXING

(71) Applicant: International Business Machines Corporation, Armonk, NY (US)

(72) Inventors: Fang Wang, Westford, MA (US); Su Liu, Austin, TX (US); Kevin Shank, Harvard, MA (US); Cheng Xu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/512,523

(22) Filed: Jul. 16, 2019

(65) Prior Publication Data

US 2020/0117941 A1    Apr. 16, 2020

Related U.S. Application Data

(63) Continuation of application No. 16/161,235, filed on Oct. 16, 2018.

(51) Int. Cl.
*G06K 9/46* (2006.01)
*G06K 9/58* (2006.01)
(Continued)

(52) U.S. Cl.
CPC ............ *G06K 9/4619* (2013.01); *G06K 9/40* (2013.01); *G06K 9/4671* (2013.01); *G06K 9/58* (2013.01); *G06K 9/4652* (2013.01); *G06K 9/628* (2013.01)

(58) Field of Classification Search
CPC .. G01N 33/0004; G06K 9/00624; G06K 9/40; G06K 9/4619; G06K 9/4671; G06K 9/58; G06K 9/4652; G06K 9/628
See application file for complete search history.

(56) References Cited

U.S. PATENT DOCUMENTS

| 5,831,876 A | 11/1998 | Orr |
| 5,972,714 A * | 10/1999 | Roland ............... G01N 33/0039 436/135 |

(Continued)

FOREIGN PATENT DOCUMENTS

| CN | 102608675 A | 7/2012 |
| CN | 102768677 A | 11/2012 |

(Continued)

OTHER PUBLICATIONS

Huan Li et al., "A Visualization Approach to Air Pollution Data Exploration:A Case Study of Air Quality Index (PM2.5) in Beijing, China" (Year: 2016).*

(Continued)

*Primary Examiner* — Mekonen T Bekele
(74) *Attorney, Agent, or Firm* — Jared L. Montanaro (57) ABSTRACT

A first image may be received by a processor. The processor may identify an image quality measure of which to evaluate the first image. The processor may compare the first image to one or more images. The processor may generate a first image quality score for the first image based on the comparing. The processor may convert the first image quality score into a first micro air-quality index. The processor may transmit the first micro air-quality index to a recording device. Additionally, a recording device may capture a first image. The recording device may send the first image to a database that may include a model associated with an image quality measure. The recording device may receive a first micro air-quality index associated with the image quality measure. The recording device may rearrange a display of the first image to display the first micro air-quality index.

7 Claims, 7 Drawing Sheets

(51) Int. Cl.
*G06K 9/40* (2006.01)
*G06K 9/62* (2006.01)

(56) References Cited

U.S. PATENT DOCUMENTS

| | | | |
|---|---|---|---|
| 7,116,801 | B2 | 10/2006 | Lin |
| 7,302,313 | B2 * | 11/2007 | Sharp ................ G01N 1/26 |
| | | | 700/275 |
| 7,856,121 | B2 | 12/2010 | Lin |
| 8,560,146 | B2 | 10/2013 | Kwon |
| 9,317,732 | B2 * | 4/2016 | Gong ................ G06K 9/00 |
| 9,740,967 | B2 * | 8/2017 | Gong ................ G06K 9/66 |
| 9,772,281 | B2 * | 9/2017 | Bertaux ............. G09B 29/007 |
| 10,268,198 | B2 | 4/2019 | Mantripragada |
| 10,359,280 | B2 | 7/2019 | Bai |
| 10,703,488 | B2 | 7/2020 | Fagundes |
| 2004/0041564 | A1 * | 3/2004 | Brown ................ A61L 9/20 |
| | | | 324/318 |
| 2005/0180636 | A1 | 8/2005 | Iizuka |
| 2009/0022393 | A1 | 1/2009 | Bar-Zohar |
| 2009/0097020 | A1 * | 4/2009 | Treado ............... G01N 21/65 |
| | | | 356/301 |
| 2011/0251800 | A1 | 10/2011 | Wilkins |
| 2014/0031082 | A1 | 1/2014 | Zishaan |
| 2015/0117767 | A1 * | 4/2015 | Gong ................ G06K 9/66 |
| | | | 382/160 |
| 2016/0116404 | A1 | 4/2016 | Bertaux |
| 2016/0155027 | A1 * | 6/2016 | Gong ................ G01N 33/0062 |
| | | | 382/159 |
| 2017/0032214 | A1 * | 2/2017 | Krenzer ............. G06T 7/77 |
| 2017/0098054 | A1 | 4/2017 | Hayward |
| 2017/0108236 | A1 | 4/2017 | Guan |
| 2019/0120508 | A1 | 4/2019 | Goswami |

FOREIGN PATENT DOCUMENTS

| | | |
|---|---|---|
| CN | 108347586 A | 7/2018 |
| WO | 2014074308 A1 | 5/2014 |
| WO | 2017133093 A1 | 8/2017 |
| WO | 2017136336 A1 | 8/2017 |

OTHER PUBLICATIONS

Airnow, "Air Quality Index (AQI) Basics," https://airnow.gov/index.cfm?action=aqibasics.aqi, printed Sep. 5, 2018, 2 pgs.

Coxworth, "Experimental smartphone app measures air pollution," https://newatlas.com/smartphone-app-measures-air-pollution/16433/, Sep. 22, 2010, printed Sep. 5, 2018, 2 pgs.

Coxworth, "Portable sensor lets users monitor air pollution on their smartphone," https://newatlas.com/citisense-air-quality-monitor/25512/, Dec. 19, 2012, printed Sep. 5, 2018, 2 pgs.

De et al., "Image Sharpness Measure for Blurred Images in Frequency Domain," Procedia Engineering 64 (2013) 149-158.

Fang et al., "Empirical Study of Urban Environmentally Livable Index for China," pp. 1-11.

Friis Bach, C. "Clean Air for Liveable Cities," https://www.huffingtonpost.com/christian-friis-bach/clean-air-for-liveable-ci_b_12485034.html, printed Sep. 5, 2018, 4 pgs.

Gallucci, M., "Wearable Technology Takes on Air Pollution and Smog with Personal Air-Quality Monitors," https://www.ibtimes.com/wearable-technology-takes-air-pollution-smog-personal-air-quality-monitors-2018324, International Business Times, Jul. 21, 2015, printed Oct. 9, 2018, 4 pgs.

Graves et al., "Using Visibility Cameras to Estimate Atmospheric Light Extinction," faculty2.ucmerced.edu/snewsam/papers/Graves_WACV11_UsingVisibility_pdf, printed Sep. 5, 2018, pp. 577-5484, ©2010 IEEE.

Imatest, "Sharpness: What is it and how is it measured?" http://www.imatest.com/docs/sharpness/, printed Sep. 5, 2018, 21 pgs.

Mell et al., "The NIST Definition of Cloud Computing," Recommendations of the National Institute of Standards and Technology, U.S. Department of Commerce, Special Publication 800-145, Sep. 2011, 7 pgs.

National Instruments, "Picture Quality Analysis: Real-Time Measurements for Objective Video Quality," http://www.ni.com/product-documentation/12703/en/, published Apr. 5, 2018, printed Oct. 9, 2018, 4 pgs.

Poduri et al. "Visibility Monitoring Using Mobile Phones," http://robotics.usc.edu/~mobilesensing/visibility/MobileAirQualitySensing.pdf, pp. 1-14, USC Robotics Research Lab, 2009.

Poon, L. "Donating Your Selfies to Science," https://www.citylab.com/life/2016/02/photo-share-social-media-ins/, printed Oct. 9, 2018, 5 pgs.

Sun et al., "Gait Characteristic Analysis and Identification Based on the iPhone's Accelerator and Gyrometer," https://www.ncbi.nlm.nih.gov/pmc/articles/PMC4208212/, published online Sep. 12, 2014, printed Oct. 9, 2018, 20 pgs.

Vyawahare, M. "Google Street View Soon to Picture Location Pollution, Too," https://www.scientificamerican.com/article/googlestreet-view-soon-to-picture-local-pollution-too/, Jul. 30, 2015, printed Sep. 5, 2018, 10 pgs.

Wikipedia, "Visibility," http://www.imatest.com/docs/sharpness/, printed Sep. 5, 2018, 4 pgs.

Wang et al., "Real-Time Micro Air-Quality Indexing," U.S. Appl. No. 16/161,235, filed Oct. 16, 2018.

List of IBM Patents or Patent Applications Treated as Related, Jul. 15, 2019, 2 pgs.

* cited by examiner

REAL-TIME MICRO AIR-QUALITY INDEXING

BACKGROUND

The present disclosure relates generally to the field of image analysis, and more specifically to determining the air-quality of a geographical location based on image quality measure (e.g. sharpness, blurriness, brightness, etc.).

A user may want to know the real-time air-quality of a particular area that they are in for various health reasons such as asthma or a pollen allergy. Currently though, only a daily air-quality metric of a general region is provided by various health, weather, environment, or other organizations. The providing of only a daily air-quality metric for a region leaves the user vulnerable to variable changes in air-quality throughout the day.

SUMMARY

Embodiments of the present disclosure disclose a method, system, and computer program product for correlating the quality (e.g., sharpness or related parameters) of an image into an air-quality metric. A first image may be received, by a processor, from a recording device. The first image may include a primary feature. The processor may identify an image quality measure of which to evaluate the first image. The processor may compare, based on the image quality measure, the first image to one or more images within a repository. The one or more images may include the same primary feature of the first image. The processor may generate a first image quality score for the first image based on the comparing of the first image to the one or more images. The processor may convert the first image quality score into a first micro air-quality index for the first image. The processor may transmit the first micro air-quality index for the image to the recording device.

In some embodiments, the present disclosure discloses a method, system, and computer program product for rendering an air-quality metric on a display. A recording device may capture a first image. The first image may include an image quality measure. The first image may be displayed on a monitor of the recording device. The recording device may send the first image to a database. The database may include a model associated with the image quality measure. The recording device may receive, from the database, a first micro air-quality index associated the image quality measure. The recording device may rearrange the display of the first image on the monitor to include a display of the first micro air-quality index.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of image analysis, and more specifically to determining the air-quality of a geographical location based on an image quality measure (e.g., an image quality parameter, such as, sharpness, brightness, etc.). While the present disclosure is not necessarily limited to such applications, various aspects of the disclosure may be appreciated through a discussion of various examples using this context.

More than half of the World's population now lives in urbanized areas, with more than 80% of the people who live in urban areas being exposed to air-quality levels exceeding World Health Organization limits. The impacts of air pollution (e.g., from dust storms, wild fires, transportation emissions, industrial facility emissions, etc.) include that of respiratory and cardiovascular disease; thus, air-quality is an important factor for a person's livability.

In addition to the health concerns posed by air pollution, visibility is also impacted by air pollution, which can be recognized through photographic image quality (e.g., the sharpness/blurriness of an image). Thus, being able to discern a correlation between image quality and air-quality may be desirable for individuals living and/or visiting urban areas.

In some embodiments, a processor (e.g., in a server, in a computer, etc.) may receive a first image from a recording device. The first image may include a primary feature (e.g., a landmark, a centered/focused object, etc.) and correlated information (e.g., a user, a device, a time, a location, a photography angle, a date and time, a weather condition, etc.). The processor may identify an image quality measure (e.g., image-quality, sharpness, brightness, etc.) of which to evaluate the first image. The processor may compare, based on the (identified/chosen/etc.) image quality measure, the first image to one or more images within a repository. The one or more images may include the same primary feature of the first image. The processor may generate a first image quality score (e.g., a sharpness score, etc.) for the first image based on the comparing of the first image to the one or more images. The processor may convert the first image quality score into a first micro air-quality index for the first image. The processor may transmit (e.g., send) the first micro air-quality index for the first image to the recording device.

For example, a user may take a photograph of Stonehenge on the user's smartphone. The smartphone may send the photograph to a server, which may identify Stonehenge as the primary feature of the photograph. The server may additionally identify the sharpness of the photograph (e.g., the image quality measure). In some embodiments, the server may identify the sharpness of the photograph by determining the boundaries between zones of different tones and/or colors of the photograph (e.g., gray stones against green grass and a blue sky, etc.). In some embodiments, the server may identify the sharpness of the photograph by determining the extinction coefficient of light traveling through the line of sight of where the photograph was taken. Extinction of light (that effects sharpness by blurring tone and/or color) is caused by the absorption and scattering of light and can be mathematically represented as $k_{ext}=k_{abs}+k_{sca}$ (i.e., extinction coefficient of light equals the absorption coefficient of light plus the scattering coefficient of light).

The server may then find one or more images that include Stonehenge as a primary feature and compare the photograph of Stonehenge that was taken by the user. The sever may compare the photographs based on the sharpness of each image to determine a sharpness for the photograph taken by the user. The server may generate, from the determined sharpness of the photograph taken by the user, a quantitative value (e.g., 80% sharpness on a scale of 0% to 100%, air-quality based on air particulars in the parts per million, air-quality based on WHO (World Health Organization) air-quality index, etc.). The server may then convert the quantitative value to an index value (e.g., 80% sharpness is given an index value of 2 on an index scale of 1 to 10, indicating a low air-quality health risk, etc.) The server may then transmit the index value to the recording device to be displayed to the user (e.g., to indicate the air-quality health risk to the user). It is noted that the example above is not limiting and that the server may convert any image quality measures (e.g., blur, brightness, pixel density, etc.) of the photograph into a quantitative value, which can be used to determine air-quality.

In some embodiments, the first image may include an origination tag and the processor may compare the first image to the one or more images within the repository by identifying a model associated with the image quality measure (e.g., identifying a model that determines air-quality based off image brightness, sharpness, aperture used, etc.). The processor may further identify that the one or more images are associated with metadata corresponding to the origination tag (e.g., GPS location of where the first image was captured, humidity of the area where the first image was captured, time of day the first image was captured, etc.). The processor may segment each of the one or more images into one or more portions based on the image quality measure. The processor may assign, based on the segmenting, each of the one or more images a respective image quality score.

For example, a cloud-based server may receive an image that is tagged with metadata that indicates that the image was captured at 5:30p.m. in Paris, France and that the image contains a display of the Eiffel Tower. The cloud-based server may identify that the user would like to know the air-quality around the Eiffel Tower at that time and the cloud-based server may identify a trained model within its repositories that can determine the air-quality based on the sharpness (e.g., lack of or inclusion of tone and/or color) of the image taken. The cloud-based serve may then identify one or more images that have been taken around the Eiffel town around 5:30p.m. on prior dates and analyze each of the one or more images based on their sharpness.

The cloud-based server may do so by segmenting each of the images based on the different tones and/or colors distinguishable within the images (e.g., breaking the images apart based on identifiable features within the images). The cloud-based server may then designate a quantitative value to each of the images based on the segmentation where images segmented more being given a high sharpness value, indicating better air-quality because particulates are not blurring the images, and images segmented into fewer portions being given a low sharpness value, indicating lower air-quality because particulates are blurring the images. In some embodiments, the first image may be segmented and given an image quality score based on the segmentation. The first image may also be put into the repository used by the processor to help determine/identify subsequent image quality scores for subsequent images taken with the same primary feature.

In some embodiments, segmenting each of the one or more images may include the processor determining that one or more secondary features are above an image quality measure threshold. The processor may identify a respective amount of each of the one or more features included in each of the one or more images. For example, one image may include a primary feature of the Sphinx, in addition to secondary features of three pyramids, sand, and the skyline; and the processor may distinguish each of the secondary features because the sharpness of the image is crisp and unblurred. Thus, the one image may be segmented into six portions based on features (e.g., the Sphinx, the three pyramids, the sand, and the skyline. However, a second image may include the same primary feature of the Sphinx, in addition to the same secondary features of the three pyramids, sand, and the skyline; but the processor may not be able to distinguish the pyramids from the sand because the sharpness is too obscured (e.g., blurred by blowing sand, etc.). Thus, the processor may only distinguish two secondary images (e.g., the sand and the skyline) in the second image and, therefore, may segment the second image into three portions (e.g., the Sphinx, the sand, and the skyline).

In some embodiments, the processor may identify an amount of one or more secondary features included in the first image. The processor may segment the first image into one or more portions. The processor may identify which respective amount of the one or more secondary features of the one or more images corresponds to the amount of the one or more secondary features included in the first image. Following the example above, an image taken by a user may include the same primary feature of the Sphinx, in addition to the same secondary features of the three pyramids, sand, and the skyline as the two, above-mentioned images; however, the processor may be able to distinguish each of the secondary features just like the one image. Thus, the image taken by the user may be segmented into six portions based on the identified features (e.g., the Sphinx, the threes pyramids, the sand, and the skyline) and identified to be corresponding with the one image (e.g., an image quality score given to the one image may also be given to the user taken image).

In some embodiments, the processor may identify that the image quality measure is sharpness of the one or more images and the first image, and the processor may train the model to correlate the image quality scores, based on sharpness, of the one or more images and the first image to air-quality. The processor may determine, from the image quality scores of the one or more images, a micro air-quality index for each of the one or more images.

In some embodiments, noise of the first image (e.g., humidity from the location of where the first image was captured, blur from the user's shaky hands, blur from wind, etc.) may be filtered out of the first image prior to identifying the image quality measure. For example, the processor may determine that a photo of the Golden Gate Bridge was taken at 6:00a.m. and that only 200 of the 250 vertical suspender ropes are distinguishable in the photo. The processor may determine from the time of day and the area of where the image was captured, that fog is the most likely reason for the lack of sharpness to the photo and not air-pollutants such as factory emissions. The processor may then augment (e.g., increase or decrease) an air-quality score by discounting the lack of sharpness based on the inference that fog is the culprit for the lack of visible vertical suspender ropes.

In some embodiments, noise of the first image may be filtered out of the first image by normalizing the first image with the one or more images in the repository. For example, a taken image may have been captured by a 10 mega-pixel camera and two other images in a repository may have been taken with 8 mega-pixel cameras. The processor may convert the 10 mega-pixel camera in to an 8 mega-pixel format in order to compare all of the images. In another example, the aperture (e.g., the iris of a camera that determines how much light to let in) of each of the cameras used to capture one or more images may be different, resulting in different saturations of light and the processor may convert each of the images into a common saturation of light.

In some embodiments of the present disclosure, a recording device may capture a first image. The first image may include an image quality measure and be displayed on a monitor of the recording device. The recording device may send the first image to a database (e.g., repository, server, etc.) that may include a model associated with the image quality measure. The recording device may receive a first micro air-quality index associated with the image quality measure from the database. The recording device may rearrange the display of the first image on the monitor to include a display of the first micro air-quality index.

For example, a user may take a photograph of a specific area on a digital camera that is a part of the Internet-of-Things. The photograph may be captured with a specific brightness and displayed on a monitor built into the digital camera. The digital camera may send the photograph to a server that may find a model that determines air-quality from the brightness of photographs. The server may then run the photograph through the model and determine an air-quality index score for the specific area based on the photograph. The server may send the air-quality index score to the digital camera and the digital camera may decrease the size of the photograph on the monitor, leaving a blank area above a top portion of the photograph, and the digital camera may place the air-quality index score in the blank area. In some embodiments, the server may determine air quality from the sharpness of the photographs.

In some embodiments, the recording device may filter noise of the first image out of the first image prior to sending the first image to the database. The noise of the first image may be filtered out of the first image by normalizing the first image with one or more images associated with the model.

In some embodiments, the first image may be normalized with the one or more images associated with the model by the recording device receiving resolution data associated with the one or more images from the database. The recording device may convert a first resolution of the first image to a second resolution. The second resolution matches the resolution data associated with the one or more images. For example, the first image may be captured by a recording device that can support an image of 300 pixels per inch, however, the model going to be used to identify the air-quality of an area featured within the first image may only support images of 200 pixels per inch. The recording device, based on the limitations of the model, may then automatically downgrade the first image into a resolution format of 200 pixels per inch. In some embodiments, the recording device may be loaded with an air-quality application that automatically makes the recording device take recordings using settings associated with a chosen model (e.g., the recording device would take images in a 200 pixel per inch format).

In some embodiments, the recording device may identify an origin point within the first image. The recording device may determine that there is a distortion within the first image. The distortion may be determined by identifying an object within the first image that is not centered with the origin point. The recording device may modify the first image to correct the distortion by focusing (e.g., centering, fixing, aligning, etc.) the object with the origin point.

For example, a user may have accidentally blurred a photograph by moving the user's camera while the photograph was being taken. The camera may identify that a person with a red shirt is the main focus of the picture (before adjusting for the noise/distortion/blur and identifying that the person with the red shirt is in front of a well-known monument). The camera may mark the middle of the person with the red shirt as an origin point of the photograph and then determine how far off from an axis the person has been blurred. The camera may then automatically, digitally move pixels within the photograph to adjust the photograph so that the blur is corrected.

In some embodiments, when capturing the first image, the recording device may identify a time, a location, and a humidity of the location where the first image was captured. The recording device may identify a primary feature of the first image and tag the first image with an origination tag. The origination tag includes data associated with the time, the location, the humidity of the location, and the primary feature.

In some embodiments, the recording device may rearrange the display of the first image on the monitor to include the display of the first micro air-quality index by determining that a portion of the first image does not exceed an image quality measure threshold. The recording device may then transpose the first micro air-quality index in the portion of the first image (that does not exceed the image quality measure threshold). In some embodiments, the recording device may identify a placement of a primary feature within the first image. The recording device may determine to exempt the transposing of the first micro air-quality index over the primary feature of the first image.

For example, a smartphone may determine that there are varying levels of sharpness within one image, with a corner of the image indistinguishing of multiple background buildings. The smartphone may determine that the corner of the image may be an unimportant area (e.g., not a primary feature of the image) of the image and transpose (e.g., put on top of, etc.) an air-quality score in the corner.

It is noted that the methods discussed above in the present disclosure allow for a computer system (e.g., client, server, etc.) to perform the previously unknown function of correlating an image quality measure to a real-world metric, namely the air quality of an area. Additionally, the methods discussed allow the computer system to more accurately and more efficiently process information related to recorded images by utilizing and constantly refining training models used to identify features of said recorded images.

Figure 1:
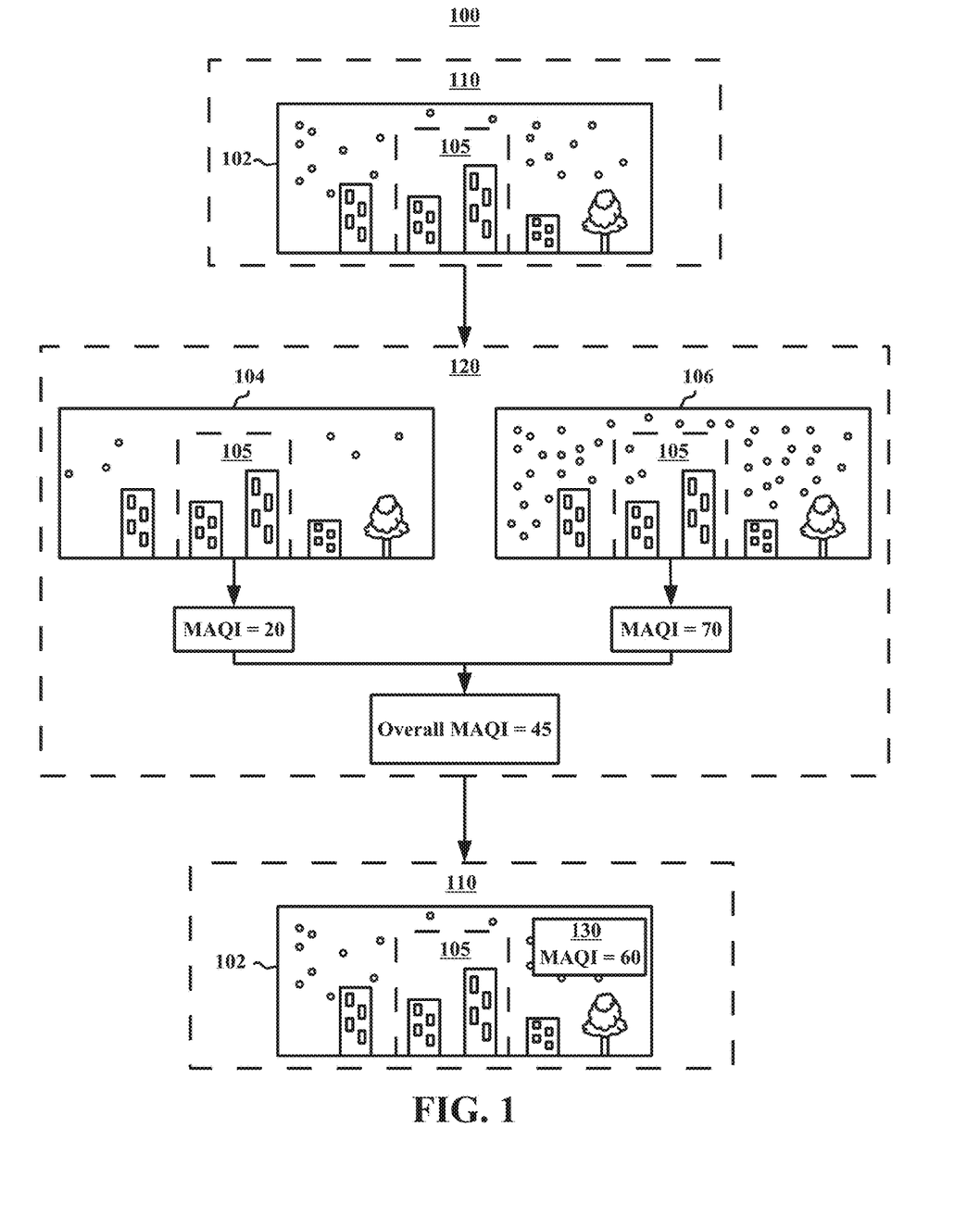
FIG. 1 illustrates an example system for determining a micro air-quality index to transpose in an image, in accordance with embodiments of the present disclosure.

Referring now to FIG. 1, illustrated is an example system 100 for determining a micro air-quality index (MAQI) to transpose in an image, in accordance with embodiments of the present disclosure. In some embodiments, the system 100 includes a recording device 110 (e.g., smartphone, digital camera, tablet, etc.) and a repository 120 (e.g., a server, a database, etc.). In some embodiments, the recording device includes a first image 102 that includes a primary feature 105. In some embodiments, the recording device can include a MAQI display 130. In some embodiments, the repository 120 includes a second image 104 and a third image 106, each of which includes the same primary feature 105. It is noted that the "dots" (e.g., particulates in the air, haze, etc.) of the first image 102, the second image 104, and the third image 106 are used to denote an image quality measure (e.g., sharpness, clarity, brightness, etc.) of each of the images 102, 104, and 106, which are then related to air-quality. It is additionally noted that like numerals are used to indicate like parts of the accompanying illustrations.

Following the illustrations provided in FIG. 1 for system 100, the recording device 110 captures the first image 102 in a particular location that is identifiable by the primary feature 105. In some embodiments, the first image 102 is displayed on a monitor (not labeled) of/in the recording device 110. The recording device 110 then identifies, using various image analysis techniques on the first image 102, the primary feature 105. The recording device 110 then sends the first image 102 to the repository 120. In some embodiments, the repository 120 may use the various image analysis techniques on the first image 102 to identify the primary feature 105.

Upon reception of the first image 102 to the repository 120, the repository 120 searches for other images within the repository 120 that include the primary feature 105; the repository 120 identifying the second image 104 and the third image 106 including the primary feature 105. The repository 120 then determines a model that can be used to identify the air-quality of the particular location.

The repository 120 determines a MAQI model which uses an image quality measure to determine air-quality of the particular location. In some embodiments, the image quality measure can use various design strategies such as Kurtosis based, derivative based, calculating edge-width, variance based, histogram based, power spectrum based, wavelet based techniques, or image quality measure (e.g., sharpness, etc.) in frequency domain. The repository 120 using the MAQI model determines a first MAQI score of 20 (out of a scale of 0-100) for the second image 104, the first MAQI score relating to the air-quality of the particular location as it has been portrayed in the second image 104 and based on the image quality measure as depicted by the "dots." Additionally, the repository using the MAQI model determines a second MAQI score of 70 for the third image 106, the second MAQI score relating to the air-quality of the particular location as it has been portrayed in the third image 106 and based on the image quality measure as depicted by the "dots."

In some embodiments, the repository 120 determines an overall MAQI score of 45 for the particular location by averaging each the first and second MAQI scores; the overall MAQI score indicating that the particular location has a mean air-quality score of 45. In some embodiments, the repository may compare the overall MAQI score of 45 to the first image 102 and determine that the first image has a first image MAQI score of 60. The repository may determine the first image MAQI score of 60 by machine-learning from the training images, e.g., the second image 104 and the third image 106, that the first image 102 has more "dots" than the second image 104 and less "dots" than the third image 106, and therefore the first image MAQI should be above 20 and below 70. Additionally, the repository 120 may take into account that the first image 102, while having fewer "dots" than the third image 106, still has a closer, comparable number of "dots" to the third image 106 opposed to the second image 104. Thus, the repository 120 may weight the first image MAQI score above the overall MAQI score and closer to the third image 106's MAQI score of 70. In some embodiments, each of the images 102, 104, and 106 may have been take at different times of the day and/or at different relative locations (e.g., first image 102 captured from the north, the second image 104 captured from the west, etc.).

In some embodiments, the repository 120 may compare each of the identified images in the repository 120 that include the primary feature 105 to the first image 102 until a near identical image (e.g., an image include a nearly identical image quality measure) is found, and the repository 120 may transfer the same MAQI score from the near identical image to the first image 102.

In some embodiments, after determining the first image MAQI score (e.g., 60), the repository 120 sends (e.g., transmits, pushes, etc.) the first image MAQI score to the recording device 110. The recording device 110, upon receipt of the first image MAQI score, transposes the first image MAQI score in the MAQI display 130. In some embodiments, the MAQI display 130 is non-transparent and covers a portion and/or secondary features of the first image 102 as to be directly visible to a user viewing the first image 102. In some embodiments, the MAQI display 130 may have a degree of transparency and not directly cover a portion and/or secondary features of the first image 102, but is still visible to a user viewing the first image 102.

Figure 2:
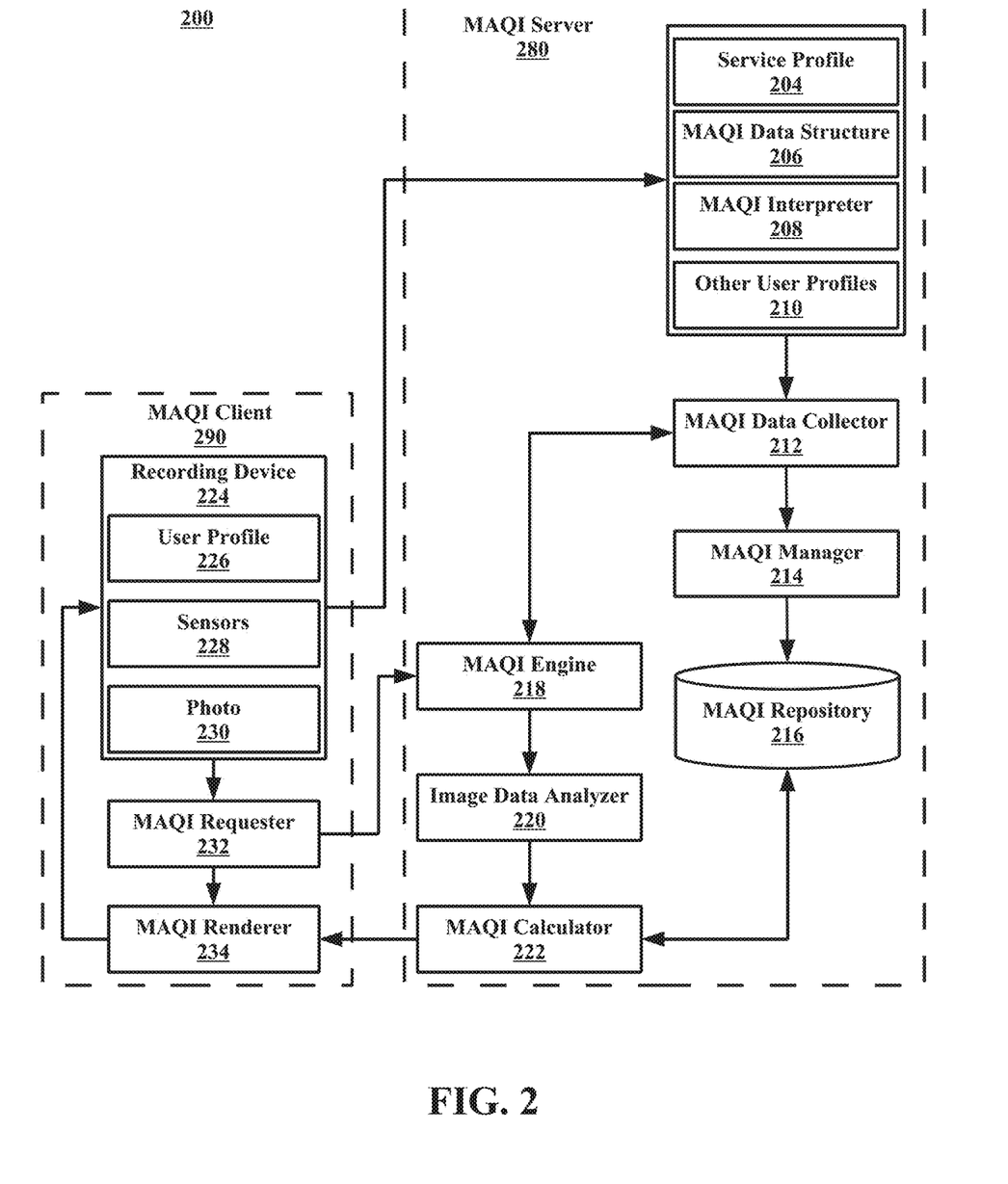
FIG. 2 illustrates an example system for generating a micro air-quality index for an image, in accordance with embodiments of the present disclosure.

Referring now to FIG. 2, illustrated is an example system 200 for generating a MAQI for an image, in accordance with embodiments of the present disclosure. In some embodiments, the system 200 includes a MAQI server 280 (e.g., a database, a repository, etc.) and a MAQI client 290 (e.g., a recording device, a smartphone, etc.). In some embodiments, the MAQI server 280 may be substantially similar to, or the same as, the repository 120 in FIG. 1, and the MAQI client 290 may be substantially similar to, or the same as, the recording device 110 in FIG. 1.

In some embodiments, the MAQI server 280 includes a service profile 204, that is a profile that incorporates pre-defined service rules, such as, image quality measure (e.g., sharpness, etc.) or visibility comparison rules, time, season, location, and shooting angle correction settings, etc. The service profile 204 may be associated with different user accounts, and may be saved in both client (e.g., recording device) and server side. In some embodiments, the MAQI server 280 includes a MAQI data structure 206 that holds and tracks images and MAQI parameters. For instance, in order to convert a given image into a meaningful MAQI, when the image is generated, information about a user, a device, a time, a location, and a weather condition associated with the generation of the image should be known. In some embodiments, the MAQI data structure 206 generates a tag (e.g., an origination tag) such as: MAQI Data (ImageID, UserID, Time, Location, sensorData[N], weatherData, and MAQI-Value), that is bundled with/incorporated with the image.

In some embodiments, the MAQI server 280 includes a MAQI interpreter 208, which uses one or more algorithms for interpreting collected MAQI inputs (e.g., a first image and sensor signals) into meaningful microclimate index. For instance, the same primary feature in different images may have different image qualities due to multiple image quality factors. If such impacts (e.g., noise) are filtered out, the image quality measure (e.g., sharpness, etc.) on a given object (e.g. Statue of Liberty) can be converted to a meaningful microclimate index. In some embodiments, the MAQI server 280 includes other user profiles 210, which incorporated a user related personal characteristic and related preference settings. The personal characteristic information can be used to determine the user's photographing skills, living community, or the MAQI rendering preference; all of which may be used to determine which factors in a first image can be disregarded as noise. The other user profiles 210 may be saved in both client and server side. In some embodiments, the service profile 204, the MAQI data structure 206, the MAQI interpreter 208, and the other user profiles 210 are provided input information from the recording device 224.

In some embodiments, the MAQI server 280 includes a MAQI data collector 212 that is in communication with, and provided input information by, the service profile 204, the MAQI data structure 206, the MAQI interpreter 208, and the other user profiles 210. The MAQI data collector 212 is a module for collecting one or more images, related sensed signals with useful information (e.g., sharpness, resolution, brightness, etc.), and parameters (e.g., time, date, location, humidity, and temperature, etc.). The MAQI data collector 212 can collect images from the Internet (e.g., image providers, public photos, social media photos, and/or personal shared photos for certain user groups), and classify them based on location, direction, shooting angle, shooting time, and image qualities. In some embodiments, the collected and classified images are saved into an image repository (e.g., a MAQI repository 216) for image searching and retrieval purposes.

In some embodiments, the MAQI server 280 includes a MAQI manager 214 that is in communication with, and receives input information from, the MAQI data collector 212. In some embodiments the MAQI manager 214 is a module for managing the one or more images collected and saved in the MAQI repository 216. The MAQI manager 214 can add, update, retrieve, and delete images based on image comparison criteria, parameters, and/or metatags (such as visibility, topic, title, content, location, position, direction, and time, etc.).

In some embodiments, the MAQI server 280 includes a MAQI engine 218 that is in communication with both a MAQI requester 232 of the MAQI client 290 and the MAQI data collector 212 of the MAQI server 280. In some embodiments, the MAQI engine 218 is input information from the MAQI requester 232 and the MAQI data collector 212. The MAQI engine 218 may additionally provide input information to the MAQI data collector 212. In some embodiments, the MAQI engine 218 is a major module/SaaS Interface for handling the MAQI requester 232. The MAQI engine 218 performs multiple functions, such as, 1) collecting one or more images with MAQI data; 2) analyzing the one or more images with MAQI data; 3) calculating a one or more MAQI scores (e.g., current, average, best, and/or worst MAQI) for a given location (the location determined from the primary feature of the one or more images and/or one or more metatags); and 4) sending the calculated MAQI score(s) to the MAQI requester 232 (e.g., for rendering on a monitor of the recording device 224 of the MAQI client 290).

In some embodiments, the MAQI server 280 includes an image data analyzer 220 that is in communication with the MAQI engine 218 and that may support the previously discussed functions of the MAQI engine 218. In some embodiments, the image data analyzer 220 is a software program for analyzing the one or more collected images and relating MAQI data to extract useful information (e.g., determining what the air-quality of a particular location is at a given time that a first image is captured) from the MAQI calculation.

In some embodiments, the MAQI server 280 includes a MAQI calculator 222 that is in communication with the MAQI repository 216, the image data analyzer 220, and the MAQI renderer 234 of the MAQI client 290. In some embodiments, the MAQI calculator 222 may retrieve input information from, and store output information in, the MAQI repository 216, and the MAQI calculator 222 may push/send output information (e.g., a MAQI score) to the MAQI renderer 234. The MAQI calculator 222 is a module for calculating a MAQI score (0%~100%) based on the one or more analyzed images' information. At least one MAQI interpretation algorithm can be used to convert given image information (e.g., sharpness, blur, etc.) to a meaningful microclimate data and then merge the climate data into a meaningful MAQI score.

In some embodiments, the MAQI calculator 222 may use various algorithms, examples of which are displayed below, in order to find a MAQI for one or more images. First the MAQI calculator 222 determines a weighed score for an image:

$$\text{Weighted score} = \frac{1}{m}\sum_{i=1}^{m} a_i X_i + \frac{1}{n}\sum_{j=1}^{n} b_k Y_k,$$

where $a_i$ is a coefficient of image quality factors of X, such as sharpness for input observation i, and where $b_k$ is a coefficient of micro weather data Y, such as visibility at observation j.

Then the MAQI calculator 222 determines a MAQI for the image following the equation:

$$MAQI = \frac{\text{weighted score}}{\text{clear image score}} \times 100\%,$$

where the clear image score is the highest weighted score of all the one or more images. For example, five images processed by the MAQI calculator 222 are generated the weighted scores of: 15 (low image quality based on a visibility observation), 30, 40, 60, and 85 (high image quality based on the visibility observation). Thus, the weighted score of 85 is be designated the "clear image score" and all other weighted scores will be compared to said score.

In some embodiments, the MAQI server includes the MAQI repository 216 that is in communication with, and receives and transmits information from, the MAQI calculator 222. The MAQI repository 216 is a database for saving the one or more collected and classified images (e.g., classified based on location, image quality, etc.), and MAQI data.

Turning now to the MAQI client 290, which may be firmware, or software that may be loaded onto a recording device 224 as an application. In some embodiments, the recording device 224 includes one or more sensors 228, which may be incorporated as part of the recording device 224. The one or more sensors 228 can be used to detect changes of a user's location, position, direction, movement speed, shooting angle, and whether the recording device 224 is inside or outside of a building. The one or more sensors 228 may be humidity sensors, dust sensors, smoke parcel sensors, GPS sensors, compass sensors, gravitational accelerator sensors, gyro-meter sensors, photoconductive cell sensors, LDR (light dependent resistor) sensors, etc.

In some embodiments, the recording device 224 includes a photo 230 that is captured by the recording device 224. The photo 230 may be the image discussed above that is processed and used to determine a MAQI score. In some embodiments, the recording device 224 includes a user profile 226, which may be used to verify a user's authorization to use access the MAQI server 280 for processing of the photo 230. The user profile 226 may be similar and/or match the service profile 204 of the MAQI server 280. In some embodiments, the information produced by the user profile 226, one or more sensors 228, and the photo 230 are pushed by the recording device 224 as inputs for the service profile 204, MAQI data structure 206, MAQI interpreter 208, and the other user profiles 210.

In some embodiments, the MAQI client 290 includes a MAQI requester 232 that is in communication with and receives input from the recording device 224. The MAQI requester 232 may also be in communication with and provide inputs for the MAQI renderer 234 and the MAQI engine 218. The MAQI requester 232 is a module for wrapping the one or more sensors 228's output and the photo 230 into the MAQI data structure 206 and calling the MAQI engine 218 to request a real-time MAQI score of the photo 230.

In some embodiments, the MAQI client 290 includes a MAQI renderer 234 that is in communication with and receives a MAQI score from the MAQI calculator 222. The MAQI renderer 234 is also in communication with and sends the MAQI score to the recording device 224. The MAQI renderer 234 is a module for rendering the received MAQI score on the user device in a preferred format, time, and location. For example, the MAQI render may rearrange displayed information on a monitor of the recording device 224 in order to transpose and/or display the MAQI score to a user.

Figure 3:
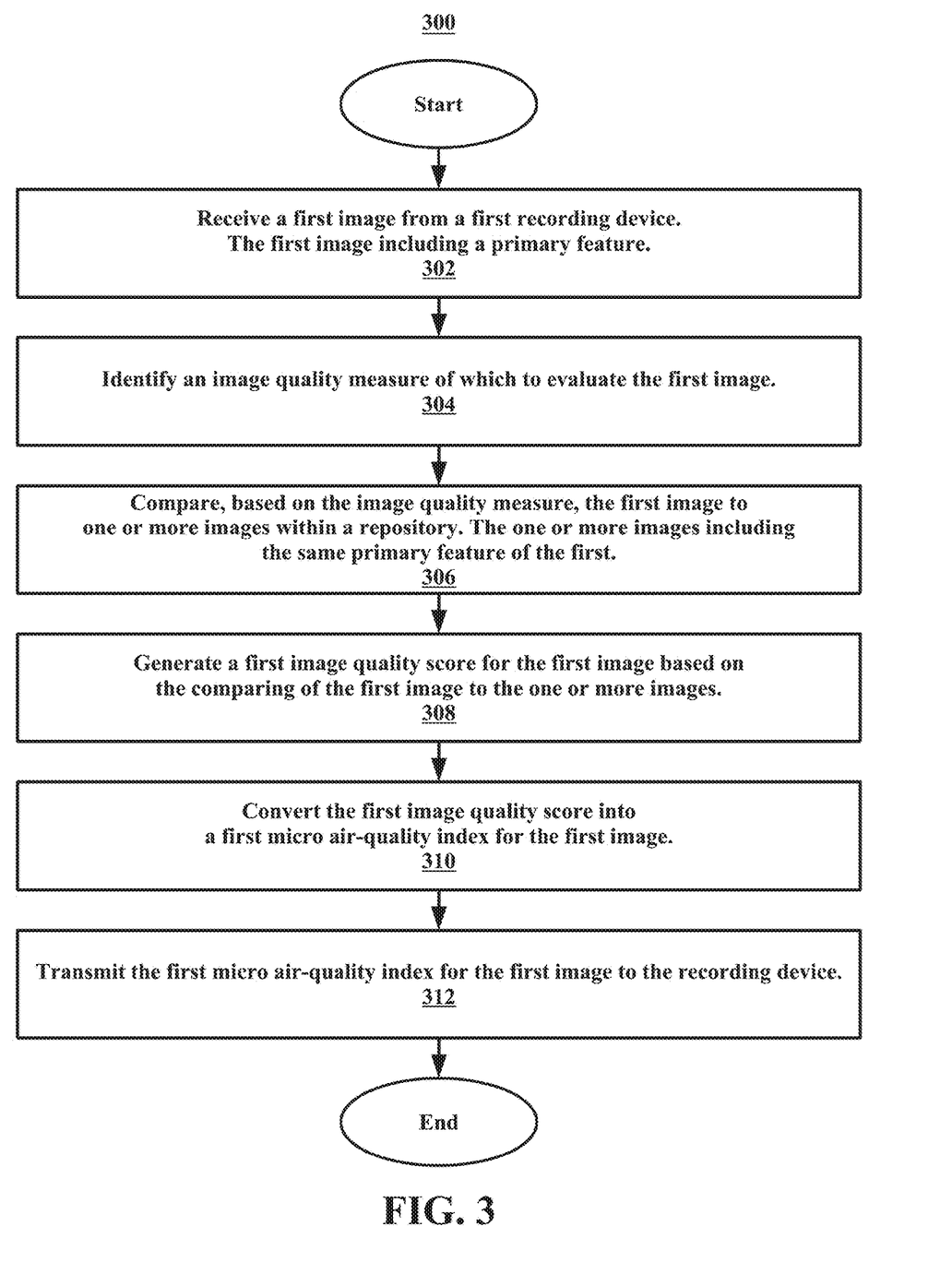
FIG. 3 illustrates a flowchart of an example method for sending a first micro air-quality index for an image to a recording device, in accordance with embodiments of the present disclosure.

Referring now to FIG. 3, illustrated is a flowchart of an example method 300 for sending a first micro air-quality index for an image to a recording device, in accordance with embodiments of the present disclosure. In some embodiments, the method 300 begins at operation 302, where a processor receives a first image from a first recording device. The first image includes a primary feature. After operation 302, the method 300 proceeds to operation 304, where the processor identifies an image quality measure of which to evaluate the first image.

Following operation 304, the method 300 proceeds to operation 306, where the processor compares, based on the image quality measure, the first image to one or more images within a repository. The one or more images include the same primary feature of the first. After operation 306, the method 300 proceeds to operation 308. At operation 308, the processor generates a first image quality score for the first image based on the comparing of the first image to the one or more images.

After operation 308, the method 300 proceeds to operation 310, where the processor converts the first image quality score for the first image into a first micro air-quality index (e.g., micro air-quality index score) for the first image.

After operation 310, the method 300 proceeds to operation 312, where the processor transmits the first image quality score for the first image to the recording device. After operation 312, the method 300 ends.

Figure 4:
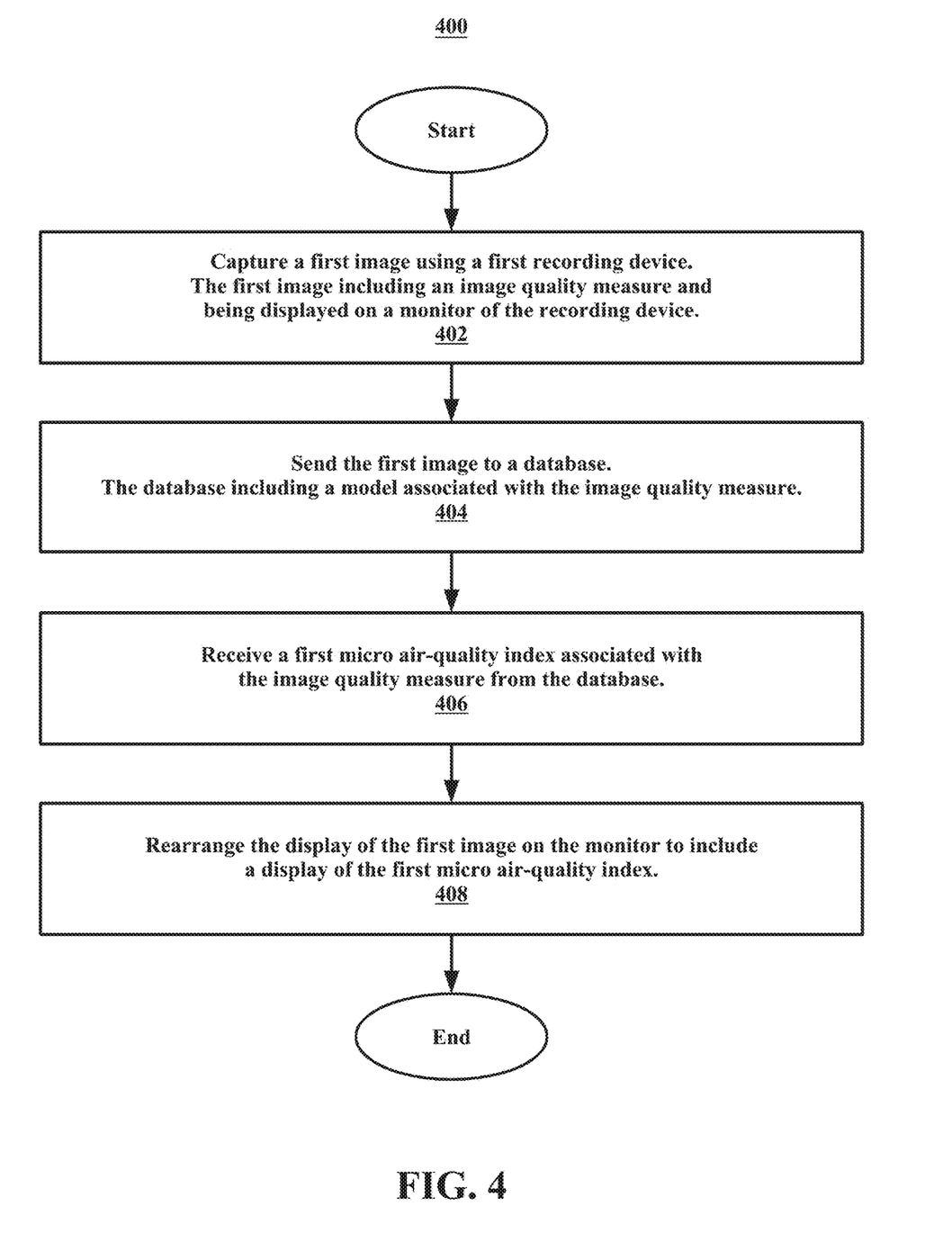
FIG. 4 illustrates a flowchart of an example method for rearranging a display of a first image on a monitor to include a display of a first micro air-quality index, in accordance with embodiments of the present disclosure.

Referring now to FIG. 4, illustrated is a flowchart of an example method 400 for rearranging a display of a first image on a monitor to include a display of a first micro air-quality index, in accordance with embodiments of the present disclosure. In some embodiments, the method 400 begins at operation 402, where a recording device captures a first image. The first image includes an image quality measure and is displayed on a monitor of the recording device.

After operation 402, the method 400 proceeds to operation 404, where the recording device sends the first image to a database. The database include a model associated with the image quality measure. Following operation 404, the method 400 proceeds to operation 406. At operation 406, the recording device receives a first micro air-quality index associated with the image quality measure from the database.

After operation 406, the method 400 proceeds to operation 408, where the recording device rearranges the display of the first image on the monitor to include a display of the first micro air-quality index. After operation 408, the method 400 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
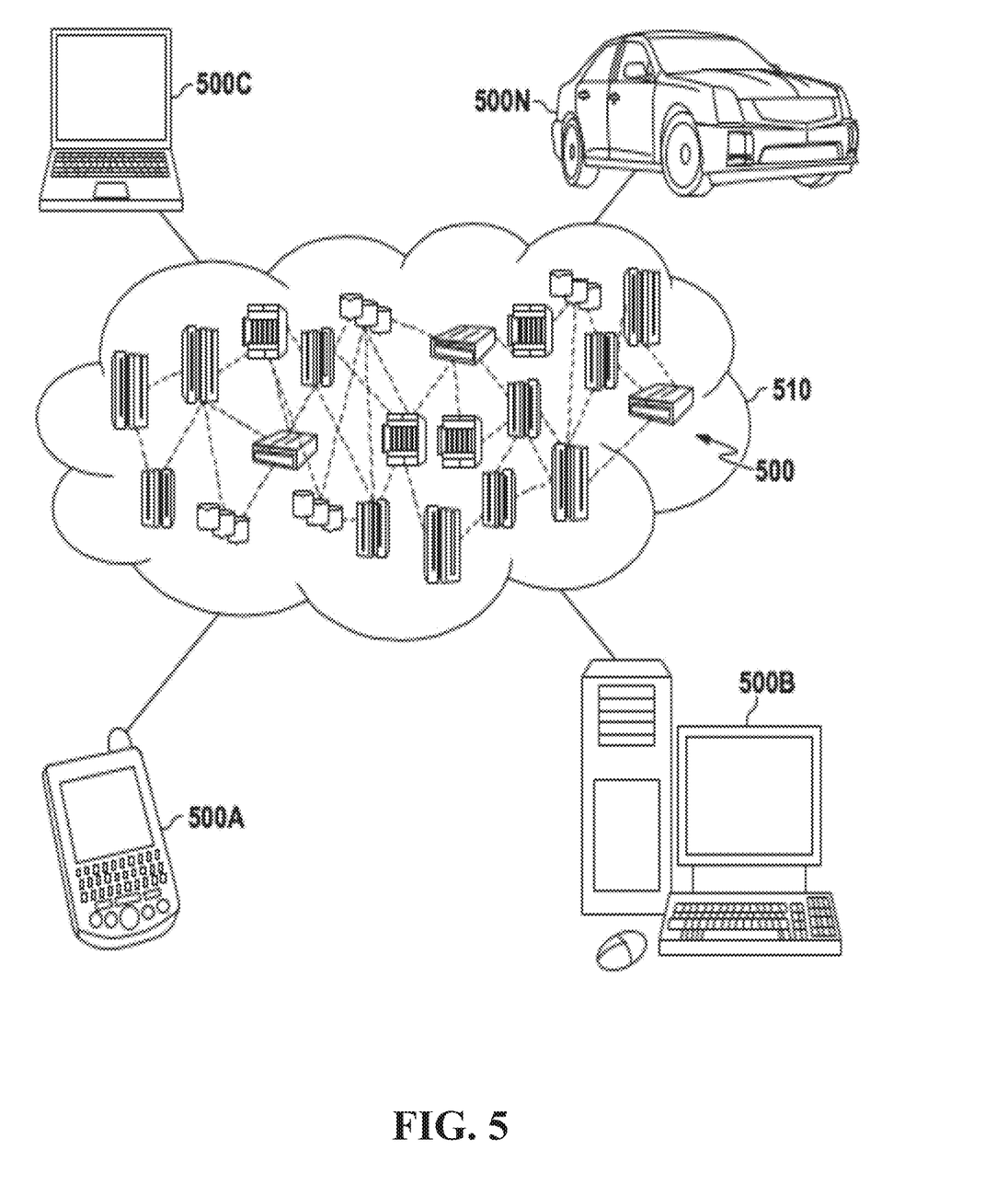
FIG. 5 depicts a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
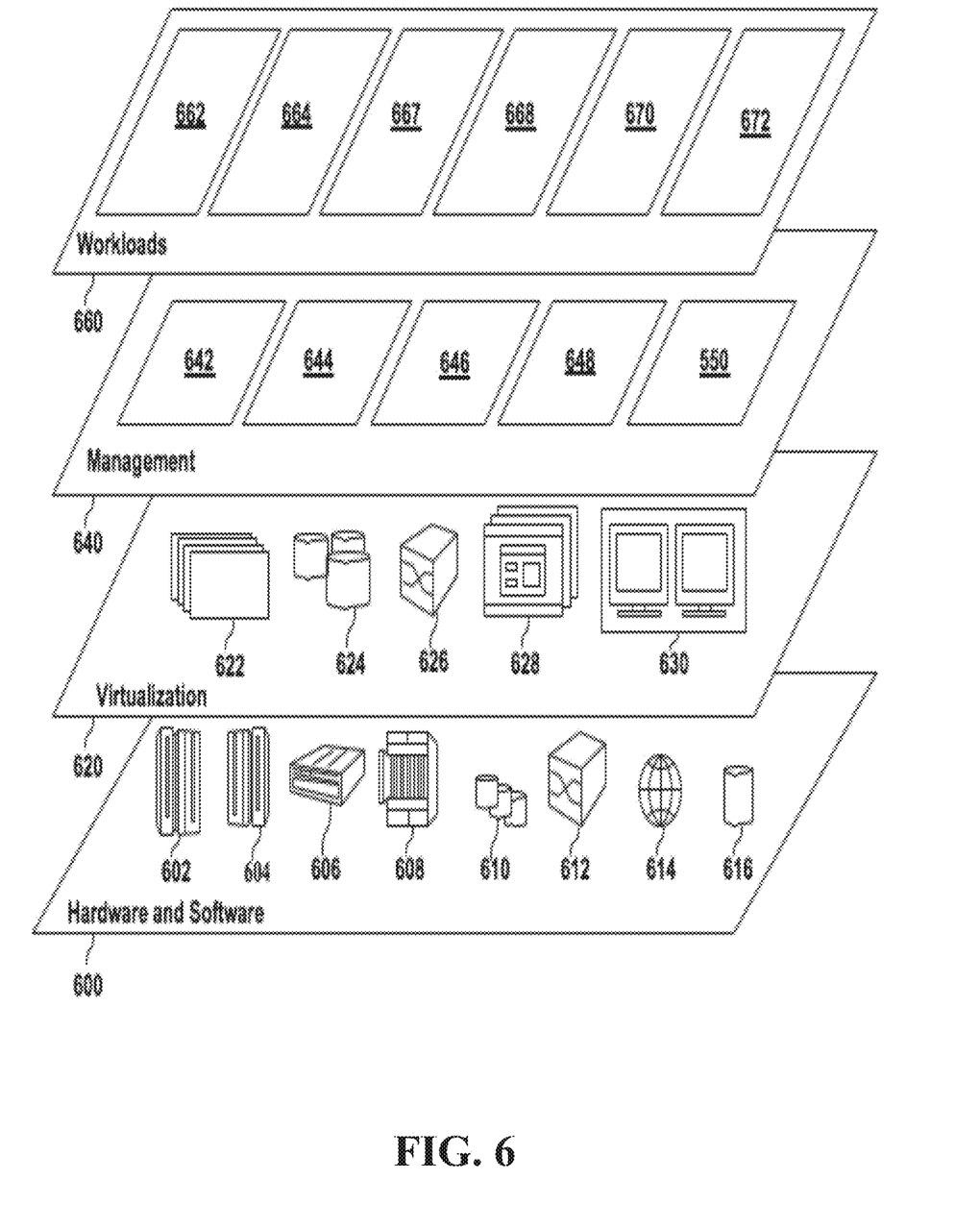
FIG. 6 depicts abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 667; data analytics processing 668; transaction processing 670; and MAQI processing 672.

Figure 7:
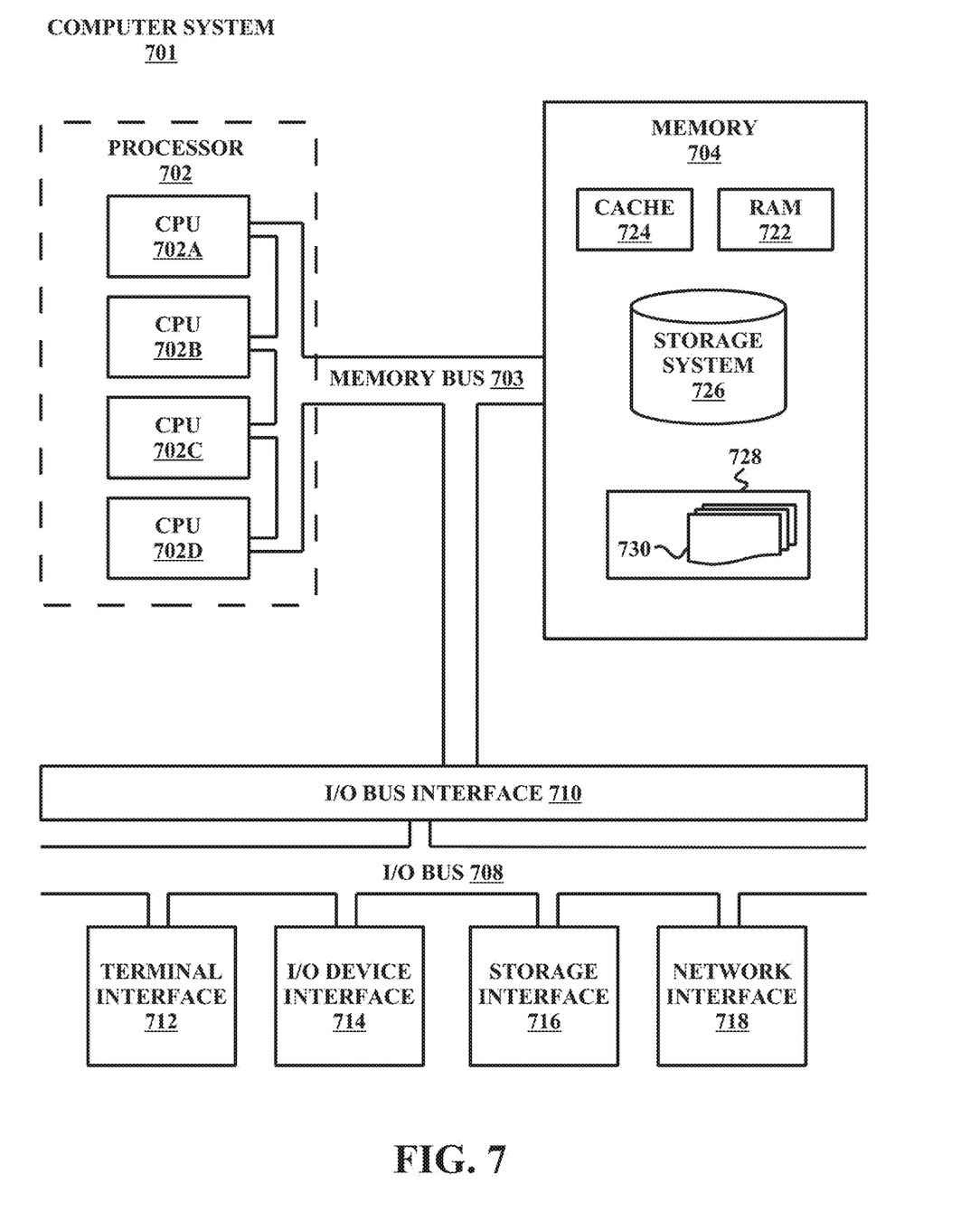
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a non-transitory computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
receiving, from a recording device, a first image, wherein the first image includes a primary feature;
identifying an image quality measure of which to evaluate the first image;
comparing, based on the image quality measure, the first image to one or more images within a repository, wherein the one or more images include the same primary feature of the first image;
generate a first image quality score for the first image based on the comparing of the first image to the one or more images;
converting the first image quality score into a first micro air-quality index for the first image; and
transmitting the first micro air-quality index for the first image to the recording device.

2. The method of claim 1, wherein the first image includes an origination tag, and wherein comparing the first image to the one or more images within the repository further comprises:
identifying a model associated with the image quality measure;

identifying that the one or more images are associated with metadata corresponding to the origination tag;

identifying that each of the one or more images include the primary feature of the first image;

segmenting each of the one or more images into one or more portions based on the image quality measure; and assigning, based on the segmenting, each of the one or more images a respective image quality score.

3. The method of claim 2, wherein segmenting each of the one or more images further comprises:

determining that one or more secondary features are above an image quality measure threshold; and identifying a respective amount of each of the one or more secondary features included in each of the one or more images.

4. The method of claim 3, further comprising:

identifying an amount of one or more secondary features included in the first image;

segmenting the first image into one or more portions; and identifying which respective amount of the one or more secondary features of the one or more images corresponds to the amount of the one or more secondary features included in the first image.

5. The method of claim 4, further comprising:

identifying that the image quality measure is sharpness of the one or more images and the first image;

training the model to correlate the image quality scores, based on sharpness, of the one or more images and the first image to air quality; and determining, from the image quality scores of the one or more images, a micro air-quality index for each of the one or more images.

6. The method of claim 1, wherein noise of the first image is filtered out of the first image prior to identifying the image quality measure.

7. The method of claim 6, wherein the noise of the first image is filtered out of the first image by normalizing the first image with the one or more images within the repository.

* * * * *